United States Patent
Drego et al.

(10) Patent No.: US 11,087,067 B2
(45) Date of Patent: Aug. 10, 2021

(54) SYSTEMS AND METHODS FOR IMPLEMENTING TILE-LEVEL PREDICATION WITHIN A MACHINE PERCEPTION AND DENSE ALGORITHM INTEGRATED CIRCUIT

(71) Applicant: quadric.io, Inc., Burlingame, CA (US)

(72) Inventors: Nigel Drego, Burlingame, CA (US); Mrinalini Ravichandran, Burlingame, CA (US); Aman Sikka, Burlingame, CA (US); Daniel Firu, Burlingame, CA (US); Veerbhan Kheterpal, Burlingame, CA (US)

(73) Assignee: quadric.io, Inc., Burlingame, CA (US)

(*) Notice: Subject to any disclaimer, the term of this patent is extended or adjusted under 35 U.S.C. 154(b) by 0 days.

(21) Appl. No.: 17/142,314

(22) Filed: Jan. 6, 2021

(65) Prior Publication Data

US 2021/0209286 A1 Jul. 8, 2021

Related U.S. Application Data

(60) Provisional application No. 62/957,698, filed on Jan. 6, 2020.

(51) Int. Cl.
| | |
|---|---|
| *G06F 30/30* | (2020.01) |
| *G06F 30/398* | (2020.01) |
| *G06F 30/337* | (2020.01) |
| *G06F 30/373* | (2020.01) |
| *G06F 30/27* | (2020.01) |
| *G06F 30/32* | (2020.01) |
| *G06F 115/10* | (2020.01) |
| *G06F 15/80* | (2006.01) |

(52) U.S. Cl.
CPC ............ *G06F 30/398* (2020.01); *G06F 30/27* (2020.01); *G06F 30/32* (2020.01); *G06F 30/337* (2020.01); *G06F 30/373* (2020.01); *G06F 15/8007* (2013.01); *G06F 2115/10* (2020.01)

(58) Field of Classification Search
None
See application file for complete search history.

(56) References Cited

U.S. PATENT DOCUMENTS

| | | | |
|---|---|---|---|
| 8,250,556 B1* | 8/2012 | Lee ................ | G06F 8/445 717/159 |
| 10,365,860 B1* | 7/2019 | Drego ............ | G06F 3/0655 |
| 10,691,464 B1* | 6/2020 | Drego ............ | G06F 9/5066 |
| 10,761,848 B1* | 9/2020 | Drego ............ | G06F 9/3838 |

(Continued)

*Primary Examiner* — Leigh M Garbowski
(74) *Attorney, Agent, or Firm* — Padowithz Alce; Alce PLLC

(57) ABSTRACT

Systems and methods of implementing tile-level predication of a computing tile of an integrated circuit includes identifying a plurality of distinct predicate state values for each of a plurality of distinct processing cores of the computing tile; calculating one or more summed predicate state values for an entirety of the plurality of distinct processing cores based on performing a summation operation of the plurality of distinct predicate state values; propagating the one or more summed predicate state values to an instructions generating circuit of the integrated circuit; and identifying, by the instructions generating circuit, a tile-level predication for the computing tile based on input of the one or more summed predicate state values.

17 Claims, 5 Drawing Sheets

(56) References Cited

U.S. PATENT DOCUMENTS

| | | | |
|---|---|---|---|
| 10,782,972 B2* | 9/2020 | Grocutt | G06F 9/30018 |
| 2019/0303518 A1* | 10/2019 | Drego | G06F 15/8046 |
| 2020/0019402 A1* | 1/2020 | Walters | G06F 9/3013 |

* cited by examiner

SYSTEMS AND METHODS FOR IMPLEMENTING TILE-LEVEL PREDICATION WITHIN A MACHINE PERCEPTION AND DENSE ALGORITHM INTEGRATED CIRCUIT

CROSS-REFERENCE TO RELATED APPLICATIONS

This application claims the benefit of U.S. Provisional Application No. 62/957,698, filed 6 Jan. 2020, which is incorporated herein in its entirety by this reference.

TECHNICAL FIELD

The one or more inventions described herein relate generally to the integrated circuitry field, and more specifically to a new and useful perception and dense algorithm processing integrated circuitry architecture in the integrated circuitry field.

BACKGROUND

Modern applications of artificial intelligence and generally, machine learning appear to be driving innovations in robotics and specifically, in technologies involving autonomous robotics and autonomous vehicles. Also, the developments in machine perception technology have enabled the abilities of many of the implementations in the autonomous robotics' and autonomous vehicles' spaces to perceive vision, perceive hearing, and perceive touch among many other capabilities that allow machines to comprehend their environments.

The underlying perception technologies applied to these autonomous implementations include a number of advanced and capable sensors that often allow for a rich capture of environments surrounding the autonomous robots and/or autonomous vehicles. However, while many of these advanced and capable sensors may enable a robust capture of the physical environments of many autonomous implementations, the underlying processing circuitry that may function to process the various sensor signal data from the sensors often lack in corresponding robust processing capabilities sufficient to allow for high performance and real-time computing of the sensor signal data.

The underlying processing circuitry often include general purpose integrated circuits including central processing units (CPUs) and graphic processing units (GPU). In many applications, GPUs are implemented rather than CPUs because GPUs are capable of executing bulky or large amounts of computations relative to CPUs. However, the architectures of most GPUs are not optimized for handling many of the complex machine learning algorithms (e.g., neural network algorithms, etc.) used in machine perception technology. For instance, the autonomous vehicle space includes multiple perception processing needs that extend beyond merely recognizing vehicles and persons. Autonomous vehicles have been implemented with advanced sensor suites that provide a fusion of sensor data that enable route or path planning for autonomous vehicles. But, modern GPUs are not constructed for handling these additional high computation tasks.

At best, to enable a GPU or similar processing circuitry to handle additional sensor processing needs including path planning, sensor fusion, and the like, additional and/or disparate circuitry may be assembled to a traditional GPU. This fragmented and piecemeal approach to handling the additional perception processing needs of robotics and autonomous machines results in a number of inefficiencies in performing computations including inefficiencies in sensor signal processing.

Accordingly, there is a need in the integrated circuitry field for an advanced integrated circuit and processing techniques that are capable of high performance and real-time processing and computing of routine and advanced sensor signals for enabling perception of robotics or any type or kind of perceptual machine.

The inventors of the inventions described in the present application have designed an integrated circuit architecture and one or more processing techniques that allow for enhanced sensor data processing capabilities and have further discovered related methods for implementing the integrated circuit architecture for several purposes including for enabling perception of robotics and various machines.

SUMMARY OF THE INVENTION(S)

In one embodiment, a method of implementing tile-level predication of a computing tile of an integrated circuit includes identifying a plurality of distinct predicate state values for each of a plurality of distinct processing cores of the computing tile of the integrated circuit; calculating one or more summed predicate state values for an entirety of the plurality of distinct processing cores based on performing a summation operation of the plurality of distinct predicate state values; propagating the one or more summed predicate state values to an instructions generating circuit of the integrated circuit; and identifying, by the instructions generating circuit, a tile-level predication for the computing tile based on input of the one or more summed predicate state values.

In one embodiment, identifying the predicate state values includes: identifying a top of stack value of a distinct predicate stack associated with each of the plurality of distinct processing cores of the computing tile based on an evaluation an associated predicate condition; and identifying a bit value of a distinct enablement bit associated with each of the plurality of distinct processing cores of the computing tile.

In one embodiment, calculating the one or more summed predicate state values includes: collecting, at one or more summation logic circuitry of the integrated circuit, the plurality of distinct predicate state values from the plurality of distinct processing cores; and in response to the collecting, performing the summation operation of the plurality of distinct predicate state values.

In one embodiment, the performing the summation operation includes: performing a first summation operation that includes summing only a plurality of top of distinct stack values of a plurality of distinct predicate stacks of the plurality of distinct processing cores; and performing a second summation operation that includes summing only a plurality of distinct enablement bit values of the plurality of distinct processing cores.

In one embodiment, calculating the one or more summed predicate state values includes: collecting, via a plurality of distinct pipeline stages, the plurality of distinct predicate state values from the plurality of distinct processing cores; and performing the summation operation of the plurality of distinct predicate state values along the plurality of distinct pipeline stages.

In one embodiment, the performing the summation operation includes: performing a first summation operation that includes summing only a plurality of top of distinct stack values of a plurality of distinct predicate stacks of the plurality of distinct processing cores; and performing a second summation operation that includes summing only a plurality of distinct enablement bit values of the plurality of distinct processing cores.

In one embodiment, calculating the one or more summed predicate values includes implementing a plurality of distinct pipeline stages that calculate the one or more summed predicate values, and the propagating the one or more summed predicate state values includes propagating the one or more summed predicate values from the plurality of distinct pipeline stages to the instructions generating circuit.

In one embodiment, calculating the one or more summed predicate values includes implementing one or more summation logic circuitry that calculate the one or more summed predicate values, and the propagating the one or more summed predicate state values includes propagating the one or more summed predicate values from the one or more summation logic circuitry to the instructions generating circuit.

In one embodiment, the identifying the plurality of distinct predicate state values includes: identifying a loop depth of a nested loop body; incrementing a loop depth counter based on the identified loop depth; tallying a subset of processing cores of the plurality of distinct processing cores that are in an active state for executing the nested loop body; and identifying predicate state values of the subset of processing cores separately from the plurality of distinct predicate state values a remainder of the plurality of distinct processing cores that are in an inactive state for executing the nest loop body.

In one embodiment, the identifying the tile-level predication for the computing tiles includes: identifying, by the instructions generating circuit, a target branch instruction directed to the identified loop depth of the nested loop body that, when executed, branches around the nested loop body based on a sum of the predicate state values of the subset of processing cores.

In one embodiment, the identifying the plurality of distinct predicate state values includes: identifying one or more predicate conditions within a loop body; identifying a predicate condition type including one or more of (i) a break disablement condition for discontinuance of an ongoing execution of future iterations of the loop body and (ii) a continue disablement condition for discontinuance of an ongoing execution of a currently executing iteration of the loop body; and identifying predicate state values for each of the one or more predicate conditions with the predicate condition type.

In one embodiment, the identifying the tile-level predication for the computing tiles includes: identifying, by the instructions generating circuit, a target branch instruction directed to an identified loop depth of the loop body that, when executed: (a) branches around a remainder of instructions within the loop body based on a sum of the predicate state values of the subset of processing cores and identifying the predicate condition type as the continue disablement condition, or (b) branches around an entirety of instructions of the loop body thereby avoid executing additional iterations of the loop body.

In one embodiment, the method includes executing a branch target instruction to branch around a target instruction that avoids a target set of instructions accessible to the plurality of distinct processing cores based on identifying the tile-level predication.

In one embodiment, identifying a branch instruction to a target instruction based on an evaluated predicate condition of the plurality of distinct processing cores of the computing tile; and executing the branch instruction to the target instruction if all the plurality of distinct processing cores are identified as inactive for the target set of instructions based on the one or more summed predicate state values.

In one embodiment, the plurality of predicate state values includes: (i) a plurality of distinct top of stack values for a plurality of distinct predicate stacks of the plurality of distinct processing cores of the computing tile; and (ii) a plurality of distinct enablement bit values of the plurality of distinct processing cores of the computing tile.

In one embodiment, the instructions generating circuit is arranged off of the computing tile, and the propagating the one or more summed predicate values includes passing the one or more summed predicate values from positions on the computing tile to the instructions generating circuit arranged off of the computing tile.

In one embodiment, identifying the tile-level predicate state of the computing tile includes: at the instructions generating circuit, toggling the tile-level predicate state between active and inactive for a target set of instructions based on the input of the one or more summed predicate state values.

DESCRIPTION OF THE PREFERRED EMBODIMENTS

Figure 1:
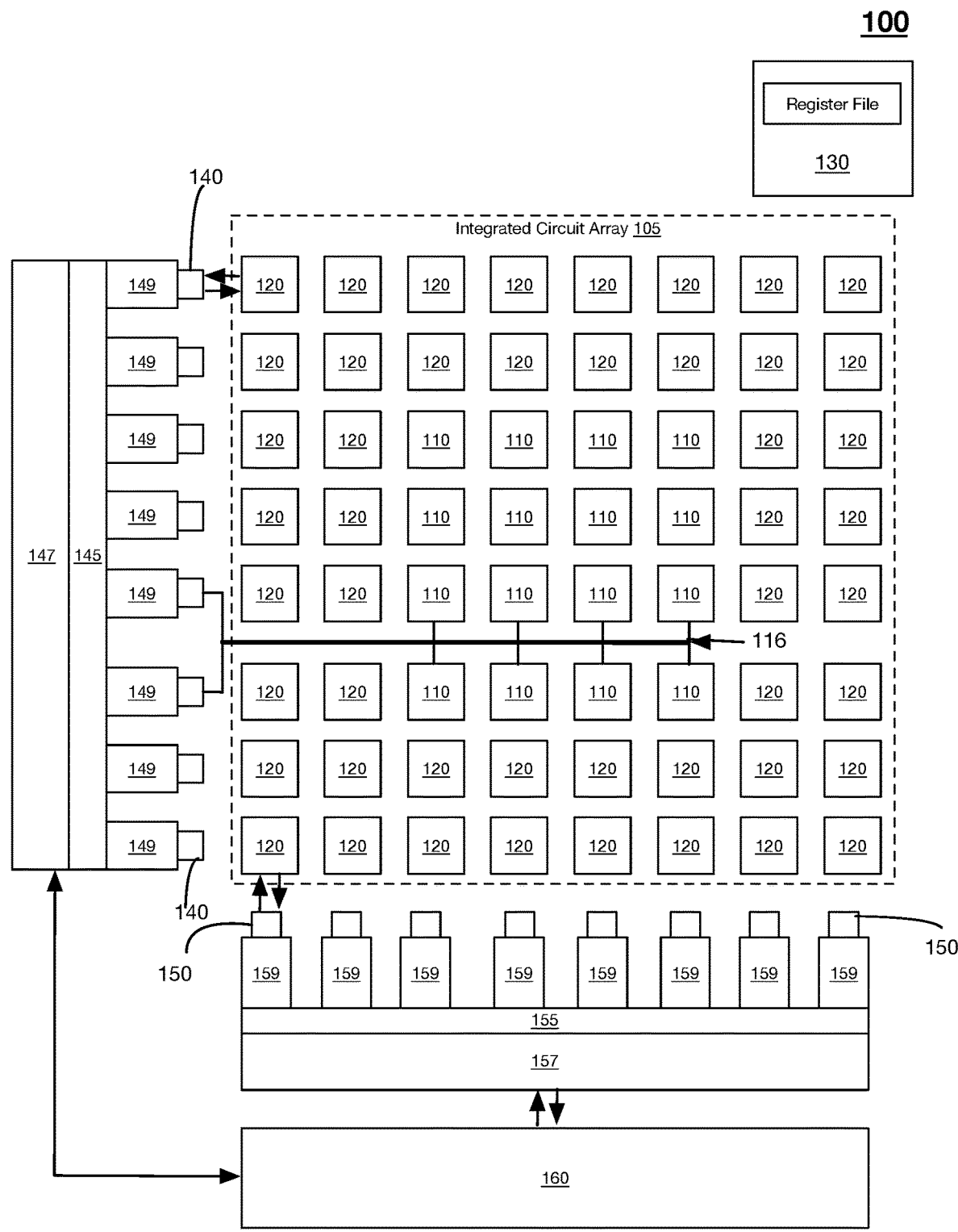
FIG. 1 illustrates a schematic of a system 100 in accordance with one or more embodiments of the present application.

The following description of preferred embodiments of the present application are not intended to limit the inventions to these preferred embodiments, but rather to enable any person skilled in the art of to make and use these inventions.

I. Overview

In parallel computing architectures, such as simultaneous instruction, multiple data (SIMD) architectures, a number of processing elements may receive a same set of instructions and, in a parallel fashion, the processing elements may function to execute the set of instructions. A technical advantage of these parallel computing architectures includes enabling a significant speed-up and in particular, when an integrated circuit may be working with computationally dense data.

However, in a predicated parallel computing architecture in which an executional operation of each processing element may be predicated on some property of data that may be unique to the respective processing element, execution times are often increase as both "True" and "False" set of instructions may be seen by each of the processing element while the individual processing elements determine whether to execute the "True" set of instructions or the "False" set of instructions based on a distinct predicated condition of each of the processing elements.

One or more embodiments of the present application, however, provide one or more systems and/or methods that may function to alleviate the executional delays accompanying a predicated parallel computing architecture thereby increasing a processing speed of the underlying integrated circuit. In one preferred embodiment of the present application, a state of a computing tile may be predicated on the basis of a computed predicated state of an array of processing cores within the computing tile. In this preferred embodiment, a determined predicate state of the computing tile may allow the array of processing elements within the computing tile to branch around a set of instructions that none of the array of processing elements intend to execute.

In one or more embodiments, a computed state of a computing tile may be "continue", "branch around", and/or the like. In one example, a "continue" state may indicate that one or more array processing cores of a computing tile intends to execute a set of target instructions for which a predication condition of each of the plurality of array processing cores may have been evaluated. In such example, an instruction memory dispatcher (Instruction Memory Dispatcher) may simply allow the array processing cores to continue executional tasks without generating interrupting instruction or executing a coarse branch around instruction causing all array processing cores to skip or overlook a target instruction set or subset. In another example, a "branch around" state may be computed on the basis that a target instruction may not be executed by any of a plurality of array processing cores of a computing tile and in such example, the branch around state informs the instruction memory dispatcher that a coarse or broad-level branch around instruction should be executed by each of the plurality of array processing cores of the computing tile.

Additionally, one or more embodiments of the present application provide systems and techniques that enable a computing tile to prematurely exit loops when it is determined that all active processing cores of a computing tile would not execute any further iterations of the loop.

It shall also be recognized that the one or more embodiments of the present application may be implemented in any suitable processing environment including, but not limited to, within one or more IMDs (Instruction Memory Dispatcher) and/or any suitable processing circuit.

The mesh architecture defined by the plurality of processing elements in the array core preferably enable in-memory computing and data movement, as described in U.S. Pat. No. 10,365,860 and U.S. patent application Ser. No. 16/292,537, which are incorporated herein in their entireties by this reference and further, enable a core-level predication and a tile-level predication.

II. A System Architecture of a Dense Algorithm and/or Perception Processing Circuit (Unit)

As shown in FIG. 1, the integrated circuit 100 (dense algorithm and/or perception processing unit) for performing perception processing includes a plurality of array cores 110, a plurality of border cores 120, a dispatcher (main controller) 130, a first plurality of periphery controllers 140, a second plurality of periphery controllers 150, and main memory 160. The integrated circuit 100 may additionally include a first periphery load store 145, a second periphery load store 155, a first periphery memory 147, a second periphery memory 157, a first plurality of dual FIFOs 149, and a second plurality of dual FIFOs 159, as described in U.S. Pat. Nos. 10,365,860, 10,691,464, and U.S. patent application Ser. No. 16/292,537, which are all incorporated herein in their entireties by this reference.

The integrated circuit 100 preferably functions to enable real-time and high computing efficiency of perception data and/or sensor data. A general configuration of the integrated circuit 100 includes a plurality of array core 110 defining central signal and data processing nodes each having large register files that may eliminate or significantly reduce clock cycles needed by an array core 110 for pulling and pushing data for processing from memory. The instructions (i.e., computation/execution and data movement instructions) generating capabilities of the integrated circuit 100 (e.g., via the dispatcher 130 and/or a compiler module 175) functions to enable a continuity and flow of data throughout the integrated circuit 100 and namely, within the plurality of array cores 110 and border cores 120.

An array core 110 preferably functions as a data or signal processing node (e.g., a small microprocessor) or processing circuit and preferably, includes a register file having a large data storage capacity (e.g., 1024 kb, etc.) and an arithmetic logic unit (ALU) or any suitable digital electronic circuit that performs arithmetic and bitwise operations on integer binary numbers. In a preferred embodiment, the register file of an array core 110 may be the only memory element that the processing circuits of an array core 110 may have direct access to. An array core 110 may have indirect access to memory outside of the array core and/or the integrated circuit array 105 (i.e., core mesh) defined by the plurality of border cores 120 and the plurality of array cores 110.

The register file of an array core 110 may be any suitable memory element or device, but preferably comprises one or more static random-access memories (SRAMs). The register file may include a large number of registers, such as 1024 registers, that enables the storage of a sufficiently large data set for processing by the array core 110. Accordingly, a technical benefit achieved by an arrangement of the large register file within each array core 110 is that the large register file reduces a need by an array core 110 to fetch and load data into its register file for processing. As a result, a number of clock cycles required by the array core 110 to push data into and pull data out of memory is significantly reduced or eliminated altogether. That is, the large register file increases the efficiencies of computations performed by an array core no because most, if not all, of the data that the array core 110 is scheduled to process is located immediately next to the processing circuitry (e.g., one or more MACs, ALU, etc.) of the array core no. For instance, when implementing image processing by the integrated circuit 100 or related system using a neural network algorithm(s) or application(s) (e.g., convolutional neural network algorithms or the like), the large register file of an array core may function to enable a storage of all the image data required for processing an entire image. Accordingly, most or if not, all layer data of a neural network implementation (or similar compute-intensive application) may be stored locally in the large register file of an array core no with the exception of weights or coefficients of the neural network algorithm(s), in some embodiments. Accordingly, this allows for optimal utilization of the computing and/or processing elements (e.g., the one or more MACs and ALU) of an array core no by enabling an array core 110 to constantly churn data of the register file and further, limiting the fetching and loading of data from an off-array core data source (e.g., main memory, periphery memory, etc.).

By comparison, to traverse a register file in a traditional system implemented by a GPU or the like, it is typically required that memory addresses be issued for fetching data from memory. However, in a preferred embodiment that implements the large register file, the (raw) input data within the register file may be automatically incremented from the register file and data from neighboring core(s) (e.g., array cores and/or border cores) are continuously sourced to the register file to enable a continuous flow to the computing elements of the array core 110 without an express need to make a request (or issuing memory addresses) by the array core 110.

While in some embodiments of the present application, a predetermined data flow scheduled may mitigate or altogether, eliminate requests for data by components within the integrated circuit array 105, in a variant of these embodiments traditional random memory access may be achieved by components of the integrated circuit array 105. That is, if an array core no or a border core 120 recognizes a need for a random piece of data for processing, the array core 110 and/or the border 120 may make a specific request for data from any of the memory elements within the memory hierarchy of the integrated circuit 100.

An array core no may, additionally or alternatively, include a plurality of multiplier (multiply) accumulators (MACs) or any suitable logic devices or digital circuits that may be capable of performing multiply and summation functions. In a preferred embodiment, each array core no includes four (4) MACs and each MAC may be arranged at or near a specific side of a rectangular shaped array core no. While, in a preferred embodiment each of the plurality of MACs of an array core 110 may be arranged near or at the respective sides of the array core no, it shall be known that the plurality of MACs may be arranged within (or possibly augmented to a periphery of an array core) the array core 110 in any suitable arrangement, pattern, position, and the like including at the respective corners of an array core no. In a preferred embodiment, the arrangement of the plurality of MACs along the sides of an array core no enables efficient inflow or capture of input data received from one or more of the direct neighboring cores (i.e., an adjacent neighboring core) and the computation thereof by the array core 110 of the integrated circuit 100.

Accordingly, each of the plurality of MACs positioned within an array core 110 may function to have direct communication capabilities with neighboring cores (e.g., array cores, border cores, etc.) within the integrated circuit 100. The plurality of MACs may additionally function to execute computations using data (e.g., operands) sourced from the large register file of an array core 110. However, the plurality of MACs preferably function to source data for executing computations from one or more of their respective neighboring core(s) and/or a weights or coefficients (constants) bus 116 that functions to transfer coefficient or weight inputs of one or more algorithms (including machine learning algorithms) from one or more memory elements (e.g., main memory 160 or the like) or one or more input sources.

The weights bus 116 may be operably placed in electrical communication with at least one or more of periphery controllers 140, 150 at a first input terminal and additionally, operably connected with one or more of the plurality of array core 110. In this way, the weight bus 116 may function to collect weights and coefficients data input from the one or more periphery controllers 140, 150 and transmit the weights and coefficients data input directly to one or more of the plurality of array cores 110. Accordingly, in some embodiments, multiple array cores no may be fed weights and/or coefficients data input via the weights bus 116 in parallel to thereby improve the speed of computation of the array cores 110.

Each array core no preferably functions to bi-directionally communicate with its direct neighbors. That is, in some embodiments, a respective array core no may be configured as a processing node having a rectangular shape and arranged such that each side of the processing node may be capable of interacting with another node (e.g., another processing node, a data storage/movement node, etc.) that is positioned next to one of the four sides or each of the faces of the array core no. The ability of an array core no to bi-directionally communicate with a neighboring core along each of its sides enables the array core 110 to pull in data from any of its neighbors as well as push (processed or raw) data to any of its neighbors. This enables a mesh communication architecture that allows for efficient movement of data throughout the collection of array and border cores 110, 120 of the integrated circuit 100.

Each of the plurality of border cores 120 preferably includes a register file. The register file may be configured similar to the register file of an array core no in that the register file may function to store large datasets. Preferably, each border core 120 includes a simplified architecture when compared to an array core no. Accordingly, a border core 120 in some embodiments may not include execution capabilities and therefore, may not include multiplier-accumulators and/or an arithmetic logic unit as provided in many of the array cores no.

In a traditional integrated circuit (e.g., a GPU or the like), when input image data (or any other suitable sensor data) received for processing compute-intensive application (e.g., neural network algorithm) within such a circuit, it may be necessary to issue padding requests to areas within the circuit which do not include image values (e.g., pixel values) based on the input image data. That is, during image processing or the like, the traditional integrated circuit may function to perform image processing from a memory element that does not contain any image data value. In such instances, the traditional integrated circuit may function to request that a padding value, such as zero, be added to the memory element to avoid subsequent image processing efforts at the memory element without an image data value. A consequence of this typical image data processing by the traditional integrated circuit results in a number of clock cycles spent identifying the blank memory element and adding a computable value to the memory element for image processing or the like by the traditional integrated circuit.

In a preferred implementation of the integrated circuit 100, one or more of the plurality of border cores 120 may function to automatically set to a default value when no input data (e.g., input sensor data) is received. For instance, input image data from a sensor (or another circuit layer) may have a total image data size that does not occupy all border core cells of the integrated circuit array 105. In such instance, upon receipt of the input image data, the one or more border cores 120 (i.e., border core cells) without input image data may be automatically set to a default value, such as zero or a non-zero constant value.

In some embodiments, the predetermined input data flow schedule generated by the dispatcher and sent to one or more of the plurality of border cores may include instructions to set to a default or a predetermined constant value. Additionally, or alternatively, the one or more border cores 120 may be automatically set to a default or a predetermined value when it is detected that no input sensor data or the like is received with a predetermined input data flow to the integrated circuit array 105. Additionally, or alternatively, in one variation, the one or more border cores 120 may be automatically set to reflect values of one or more other border cores having input sensor data when it is detected that no input sensor data or the like is received with a predetermined input data flow to the integrated circuit array 105.

Accordingly, a technical benefit achieved according to the implementation of one or more of the plurality of border cores 120 as automatic padding elements, may include increasing efficiencies in computation by one or more of the plurality of array cores 110 by minimizing work requests to regions of interest (or surrounding areas) of input sensor data where automatic padding values have been set. Thereby, reducing clock cycles used by the plurality of array core 110 in performing computations on an input dataset.

In a preferred implementation of the integrated circuit 100, the progression of data into the plurality of array cores no and the plurality of border cores 120 for processing is preferably based on a predetermined data flow schedule generated at the dispatcher 130. The predetermined data flow schedule enables input data from one or more sources (e.g., sensors, other NN layers, an upstream device, etc.) to be loaded into the border cores 120 and array cores no without requiring an explicit request for the input data from the border cores 120 and/or array cores no. That is, the predetermined data flow schedule enables an automatic flow of raw data from memory elements (e.g., main memory 160) of the integrated circuit 100 to the plurality of border cores 120 and the plurality of array cores 110 having capacity to accept data for processing. For instance, in the case that an array core no functions to process a first subset of data of a data load stored in its register file, once the results of the processing of the first subset of data is completed and sent out from the array core no, the predetermined data flow schedule may function to enable an automatic flow of raw data into the array core 110 that adds to the data load at the register file and replaces the first subset of data that was previously processed by the array core no. Accordingly, in such instance, no explicit request for additional raw data for processing is required from the array core no. Rather, the integrated circuit 100 implementing the dispatcher 130 may function to recognize that once the array core 110 has processed some amount of data sourced from its register file (or elsewhere) that the array core no may have additional capacity to accept additional data for processing.

In a preferred embodiment, the integrated circuit 100 may be in operable communication with an instructions generator that functions to generate computation, execution, and data movement instructions. The instructions generator may be arranged off-chip relative to the components and circuitry of the integrated 100. However, in alternative embodiments, the instructions generator may be cooperatively integrated within the integrated circuit 100 as a distinct or integrated component of the dispatcher 130.

Preferably, the instructions generator may be implemented using one or more general purpose computers (e.g., a Mac computer, Linux computer, or any suitable hardware computer) or general purpose computer processing (GPCP) units that function to operate a compiler module 175 that is specifically configured to generate multiple and/or disparate types of instructions. The compiler module 175 may be implemented using any suitable compiler software (e.g., a GNU Compiler Collection (GCC), a Clang compiler, and/or any suitable open source compiler or other compiler). The compiler module 175 may function to generate at least computation instructions and execution instructions as well as data movement instructions. In a preferred embodiment, at compile time, the compiler module 175 may be executed by the one or more GPCP units to generate the two or more sets of instructions computation/execution instructions and data movement instructions sequentially or in parallel. In some embodiments, the compiler module 175 may function to synthesize multiple sets of disparate instructions into a single composition instruction set that may be loaded into memory (e.g., instructions buffer, an external DDR, SPI flash memory, or the like) from which the dispatcher may fetch the single composition instruction set from and execute.

In a first variation, however, once the compiler module 175 generates the multiple disparate sets of instructions, such as computation instructions and data movement instructions, the instructions generator may function to load the instructions sets into a memory (e.g., memory 160 or off-chip memory associated with the generator). In such embodiments, the dispatcher 130 may function to fetch the multiple sets of disparate instructions generated by the instructions generator from memory and synthesize the multiple sets of disparate instructions into a single composition instruction set that the dispatcher may execute and/or load within the integrated circuit 100.

In a second variation, the dispatcher 130 may be configured with compiling functionality to generate the single composition instruction set. In such variation, the dispatcher 130 may include processing circuitry (e.g., microprocessor or the like) that function to create instructions that include scheduled computations or executions to be performed by various circuits and/or components (e.g., array core computations) of the integrated circuit 100 and further, create instructions that enable a control a flow of input data through the integrated circuit 100. In some embodiments, the dispatcher 130 may function to execute part of the instructions and load another part of the instructions into the integrated circuit array 105. In general, the dispatcher 130 may function as a primary controller of the integrated circuit 100 that controls and manages access to a flow (movement) of data from memory to the one or more other storage and/or processing circuits of the integrated circuit 100 (and vice versa). Additionally, the dispatcher 130 may schedule control execution operations of the various sub-controllers (e.g., periphery controllers, etc.) and the plurality of array cores no.

In some embodiments, the processing circuitry of the dispatcher 130 includes disparate circuitry including a compute instruction generator circuit 132 and a data movement instructions generator circuit (e.g., address generation unit or address computation unit) that may independently generate computation/execution instructions and data transfers/movements schedules or instructions, respectively. Accordingly, this configuration enables the dispatcher 130 to perform data address calculation and generation of computation/execution instructions in parallel. The dispatcher 130 may function to synthesize the output from both the computer instructions generator circuit 132 and the data movement instructions generator circuit into a single instructions composition that combines the disparate outputs.

The single instructions composition generated by the instructions generator and/or the dispatcher 130 may be provided to the one or more downstream components and integrated circuit array 105 and allow for computation or processing instructions and data transfer/movement instructions to be performed simultaneously by these various circuits or components of the integrated circuit 100. With respect to the integrated circuit array 105, the data movement component of the single instructions composition may be performed by one or more of periphery controllers 140, 150 and compute instructions by one or more of the plurality of array cores 110. Accordingly, in such embodiment, the periphery controllers 140, 150 may function to decode the data movement component of the instructions and if involved, may perform operations to read from or write to the dual FIFOs 149, 159 and move that data from the dual FIFOs 149, 159 onto a data bus to the integrated circuit (or vice versa). It shall be understood that the read or write operations performed by periphery controllers 140, 150 may performed sequentially or simultaneously (i.e., writing to and reading from dual FIFOs at the same time).

It shall be noted that while the compute instructions generator circuit 132 and the data movement instructions generator circuit are preferably separate or independent circuits, in some embodiments the compute instructions generator circuit 132 and the data movement instructions generator circuit may be implemented by a single circuit or a single module that functions to perform both compute instructions generation and data movement instruction generation.

In operation, the dispatcher 130 may function to generate and schedule memory addresses to be loaded into one or more the periphery load store 145 and the periphery load store 155. The periphery load stores 145, 155 preferably include specialized execution units that function to execute all load and store instructions from the dispatcher 130 and may generally function to load or fetch data from memory or storing the data back to memory from the integrated array core. The first periphery load store 145 preferably communicably and operably interfaces with both the first plurality of dual FIFOs 149 and the first periphery memory 147. The first and the second periphery memory 147, 157 preferably comprise on-chip static random-access memory.

In configuration, the first periphery load store 145 may be arranged between the first plurality of dual FIFOs 149 and the first periphery memory 147 such that the first periphery load store 145 is positioned immediately next to or behind the first plurality of dual FIFOs 149. Similarly, the second periphery load store 155 preferably communicably and operably interfaces with both the second plurality of dual FIFOs 159 and the second periphery memory 157. Accordingly, the second periphery load store 155 may be arranged between the second plurality of dual FIFOs 159 and the second periphery memory 157 such that the second periphery load store 155 is positioned immediately next to or behind the second plurality of dual FIFOs 159.

In response to memory addressing instructions issued by the dispatcher 130 to one or more of the first and the second periphery load stores 145, 155, the first and the second periphery load stores 145, 155 may function to execute the instructions to fetch data from one of the first periphery memory 147 and the second periphery memory 157 and move the fetched data into one or more of the first and second plurality of dual FIFOs 149, 159. Additionally, or alternatively, the dual FIFOs 149, 159 may function to read data from a data bus and move the read data to one or more of the respective dual FIFOs or read data from one or more of the dual FIFOs and move the read data to a data bus. Similarly, memory addressing instructions may cause one or more of the first and the second periphery load stores 145, 155 to move data collected from one or more of the plurality of dual FIFOs 149, 159 into one of the first and second periphery memory 147, 157.

Each of the first plurality of dual FIFOs 149 and each of the second plurality of dual FIFOs 159 preferably comprises at least two memory elements (not shown). Preferably, the first plurality of dual FIFOs 149 may be arranged along a first side of the integrated circuit array 105 with each of the first plurality of dual FIFOs 149 being aligned with a row of the integrated circuit array 105. Similarly, the second plurality of dual FIFOs 159 may be arranged along a second side of the integrated circuit array 105 with each of the second plurality of dual FIFOs 159 being aligned with a column of the integrated circuit array 105. This arrangement preferably enables each border 120 along the first side of the integrated circuit array 105 to communicably and operably interface with at least one of the first periphery controllers 145 and each border 120 along the second side of the integrated circuit array 105 to communicably and operably interface with at least one of the second periphery controllers 155.

While it is illustrated in at least FIG. 1 that there are a first and second plurality of dual FIFOs, first and second periphery controllers, first and second periphery memories, and first and second load stores, it shall be noted that these structures may be arranged to surround an entire periphery of the integrated circuit array 105 such that, for instance, these components are arranged along all (four) sides of the integrated circuit array 105.

The dual FIFOs 149, 159 preferably function to react to specific instructions for data from their respective side. That is, the dual FIFOs 149, 159 may be configured to identify data movement instructions from the dispatcher 130 that is specific to either the first plurality of dual FIFOs 149 along the first side or the second plurality of dual FIFOs along the second side of the integrated circuit array 105.

According to a first implementation, each of the dual FIFOs may use first of the two memory elements to push data into the integrated circuit array 105 and second of the two memory elements to pull data from the integrated circuit array 105. Thus, each dual FIFO 149, 159 may have a first memory element dedicated for moving data inward into the integrated circuit array 105 and a second memory element dedicated for moving data outward from the integrated circuit array 105.

According to a second implementation, the dual FIFOs may be operated in a stack (second) mode in which each respective dual FIFO functions to provide data into the integrated circuit array 105 in a predetermined sequence or order and collect the data from the integrated circuit array 105 in the same predetermined sequence or order.

Additionally, the integrated circuit 100 preferably includes main memory 160 comprising a single unified memory. The main memory 160 preferably functions to store data originating from one or more sensors, system-derived or generated data, data from one or more integrated circuit layers, data from one or more upstream devices or components, and the like. Preferably, the main memory 160 comprises on-chip static random-access memory or the like.

Additionally, or alternatively, main memory 160 may include multiple levels of on-die (on-chip) memory. In such embodiments, the main memory 160 may include multiple memory (e.g., SRAM) elements that may be in electrical communication with each other and function as a single unified memory that is arranged on a same die as the integrated circuit array 105.

Additionally, or alternatively, main memory 160 may include multiple levels of off-die (off-chip) memory (not shown). In such embodiments, the main memory 160 may include multiple memory (e.g., DDR SRAM, high bandwidth memory (HBM), etc.) elements that may be in electrical communication with each other and function as a single unified memory that is arranged on a separate die than the integrated circuit array.

It shall be noted that in some embodiments, the integrated circuit 100 includes main memory 160 comprising memory arranged on-die and off-die. In such embodiments, the on-die and the off-die memory of the main memory 160 may function as a single unified memory accessible to the on-die components of the integrated circuit 100.

Each of the first periphery memory 147 and the second periphery memory 157 may port into the main memory 160. Between the first periphery memory 147 and the main memory 160 may be arranged a load store unit that enables the first periphery memory 147 to fetch data from the main memory 160. Similarly, between the second periphery memory 157 and the main memory 160 may be arranged a second load store unit that enables the second periphery memory 157 to fetch data from the main memory 160.

It shall be noted that the data transfers along the memory hierarchy of the integrated circuit 100 occurring between dual FIFOs 149, 159 and the load stores 145, 155, between the load stores 145, 155 and the periphery memory 147, 157, and the periphery memory 147, 157 and the main memory 160 may preferably be implemented as prescheduled or predetermined direct memory access (DMA) transfers that enable the memory elements and load stores to independently access and transfer data within the memory hierarchy without direct invention of the dispatcher 130 or some main processing circuit. Additionally, the data transfers within the memory hierarchy of the integrated circuit 100 may be implemented as 2D DMA transfers having two counts and two strides thereby allowing for efficient data access and data reshaping during transfers. In a preferred embodiment, the DMA data transfers may be triggered by a status or operation of one or more of the plurality of array cores 110. For instance, if an array core is completing or has completed a processing of first set of data, the completion or near-completion may trigger the DMA transfers to enable additional data to enter the integrated circuit array 105 for processing.

Figure 2:
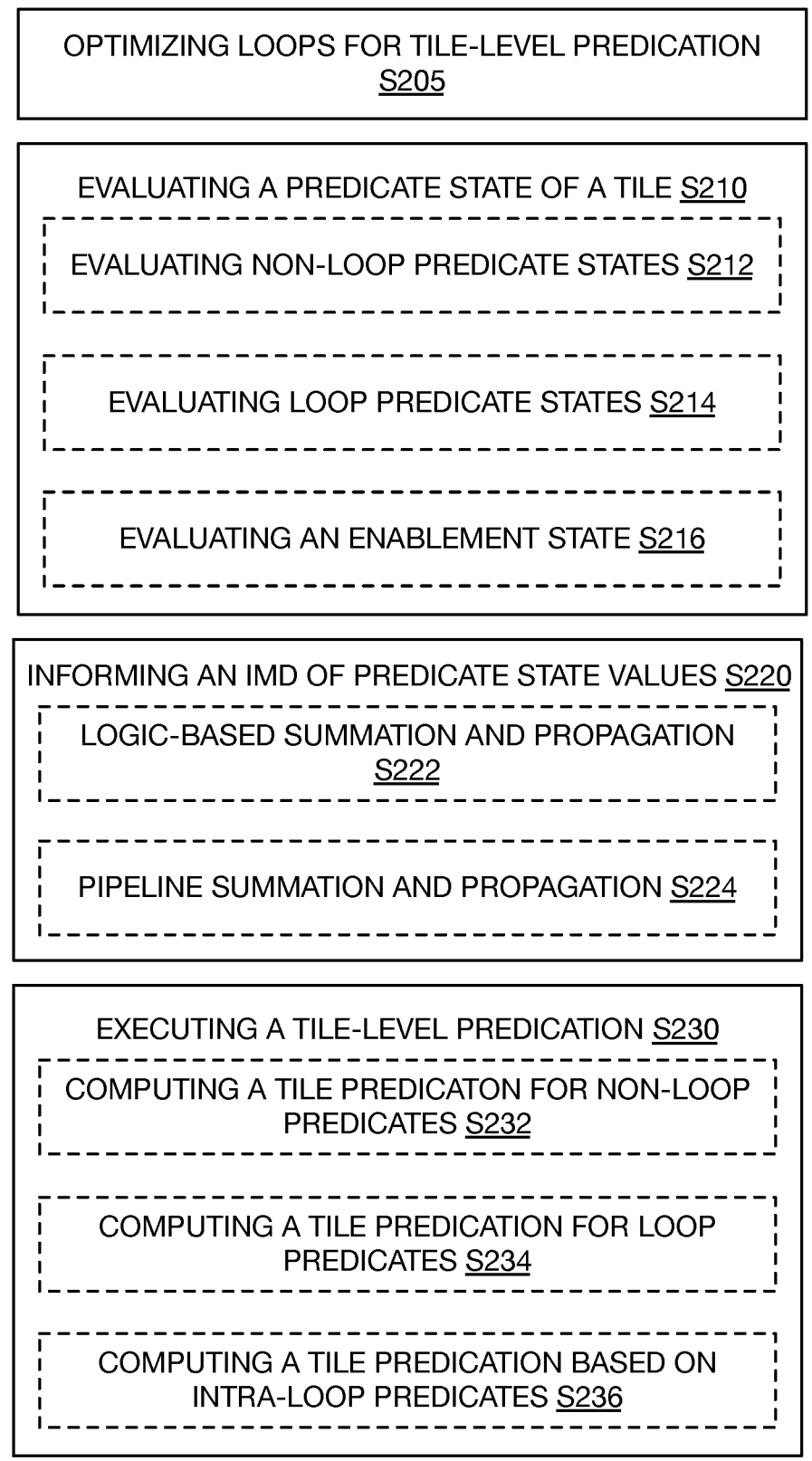
FIG. 2 illustrates a method 200 for implementing a tile-level predication in accordance with one or more embodiments of the present application.

III. Method for Tile-Level Predication of an Array of Processing Cores of a Computing Tile As shown by way of example in FIG. 2, a method 200 for optimizing nested loop instructions includes optimizing loop predicates for tile-level predication S205, evaluating a predicate state of a computing tile S210, implement logic circuitry that functions to collect and sum predicate state values S220, and identifying whether to execute a tile-level predication S230.

The method 200 preferably functions to optimize an operation of an integrated circuit array of a computing tile by employing a computing tile-scaled predication. In one or more embodiments, the method 200 enables a tile-level predication of computing tile based on (two) per-processing core predication properties including [1] a first processing core predication property that indicates whether a given processing core within a computing tile is enabled or not (i.e., enable bit=1 or 0, etc.) and [2] a second processing core predication property that indicates a current predicate value (e.g., 1 or 0) of a top of a predicate stack of the given processing core. In such embodiments, the method 200 may function to use these predication properties of each of a plurality of processing cores within an array of processing cores of a given computing tile to improve efficiencies in processing and/or handling (SIMD) instructions or the like.

2.05 Compiler Optimizations for Tile-Level Predication

S205, which includes optimizing loop predicates for tile-level predication, may function to identify one or more loop predicates of an instruction set and modify the associated loop instructions to better inform a tile-level predication of a computing tile.

In a preferred embodiment, S205 may function to identify one or more nested loop of a subject instruction set and augment or modify the subject instruction set to include instructions for incrementing and/or decrementing a loop depth counter that allows an accurate tracking a proper depth of each loop body and/or nested loop body.

Preferably, S205 may function to implement a compiler or the like that may function to insert a loop depth instruction (e.g., incloopdepth) prior to a given loop body which may instruct an instructions generating circuit to tally or identify a number of currently active processing cores that intend to execute the given loop body based on an evaluation of a predicate condition associated with each of the processing cores and further increment a loop depth counter associated with the given loop body thereby identifying a loop depth of the given loop body.

Additionally, or alternatively, S205 may function to include or insert an instruction (e.g., decloopdepth instruction) (immediately) after a loop exit or exiting a given loop body that, when executed or at runtime, causes the instructions generating circuit to decrement a loop depth counter, which may effectively reset the loop depth counter associated with the given loop to an initial value immediately prior to entering the given loop body.

Additionally, or alternatively, S205 may function to amend or modify an enable instruction of a given loop body to include a loop depth instruction corresponding to a loop depth of the enable instruction. That is, in some embodiments, S205 optimizes an instruction set to enable a tracking a depth or position of enable instruction within a subject instruction thereby enabling an instructions generating circuit or the like to store or track a loop depth at which a given processing core was enabled. Additionally, or alternatively, S205 may function to amend or modify a disable instruction in a similar manner to include a loop depth instruction that, when executed, causes an instructions generating circuit or the like to track and/or store a position or loop depth at which a given processing core was disabled.

Preferably, S205 may function to set or include the loop depth instructions of the enable instruction and/or the disable instruction to match a loop depth of a given loop body to which the enable instruction and/or the disable instruction affects.

A technical advantage of at least the above embodiments may include ensuring that only a subject of processing cores that should be re-enabled at loop exit (i.e., the processing cores that were conditionally disabled inside of a current loop, may be re-enabled and no other processing cores). Accordingly, an instructions generating circuit or the like may function to identify if a predicate condition should be branched around and additionally whether an entire loop body at a given depth should be exited in the circumstance that all active processing cores have executed an instruction (e.g., a loop break or a loop continue) that indicates that all active processing cores may no longer be active or that all active cores require a premature exit of a current iteration of a given loop body and intend to loop back to a loop entry of the given loop body.

Intra-Loop Optimizations

Additionally, or alternatively, S205 may function to augment or modify loop instructions having one or more predicate conditions that may affect a continued execution of a given loop body. That is, in one or more embodiments, while a start of an execution of a loop body may be predicated on a condition that may determine whether a processing core processes or executes the loop body, in some embodiments, the loop body may include one or more predicated conditions for a discontinuance of a current iteration of the loop body or a complete break or stop from executing any future iterations of the loop body.

Figure 3:
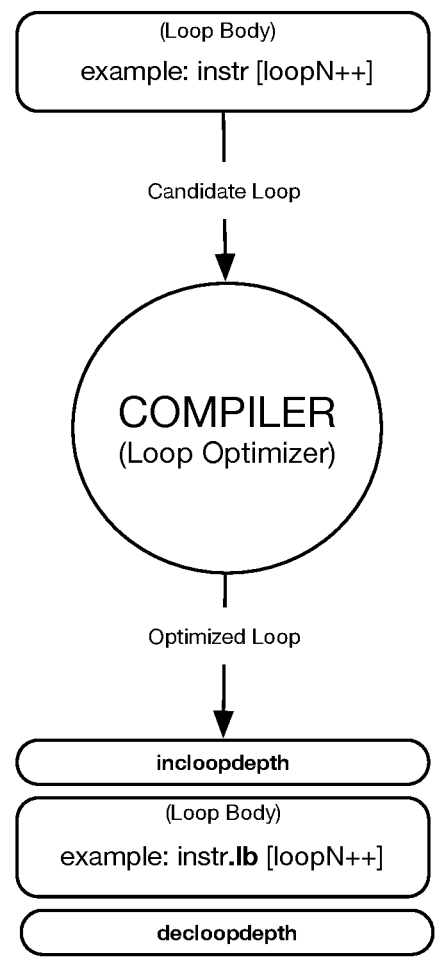
FIG. 3 illustrates a schematic that examples loop optimization at compile time in accordance with one or more embodiments of the present application.

In the one or more embodiments in which a predicated loop break instruction may be identified within a loop body at compile time, S205 may function to augment or modify the loop body to include a processing core disabling instruction (e.g., Disable B) that, when executed at runtime, causes a given processing core to cease an execution of the instructions of the loop body, as shown by way of example in FIG. 3. In such embodiments, a predicate state value of the enable bit associated with the given processing core may be evaluated as 0, False, or a similar negative execution value that indicates that the given processing core may not intend or may be inactive to execute any further iterations of the loop body.

Additionally, in the one or more embodiments, a predicated loop continue instruction may be identified within a loop body at compile time, S205 may function augment or modify the loop body to include a processing core disabling instruction (e.g., Disable C) that, when executed at runtime, causes a given processing core to cease an execution of a current iteration the of the loop body. In such embodiments, a predicate state value of the enable bit associated with the given processing core may be evaluated as 0, False, or a similar negative execution value that indicates that the given processing core may not intend or may be inactive to execute the current iteration of the loop body but may possibly continue an execution of subsequent iterations (if any) of the loop body.

It shall be noted that each of the disabling instructions inserted by a compiler or the like may additionally or alternatively include branch targets that may be executed together with the disabling instruction. In such embodiment, the branch target may point to a loop exit of a loop body and forwardly onto a different set of instructions or to a stop of processing by a given core in the case that the disabling instruction may be associated with a loop break instruction or the like. Additionally, or alternatively, the branch target may point to a starting instruction or an entry of a given loop body in the case that the disabling instruction may be associated with a loop continue instruction or the like.

2.10 Evaluating a Predicate State of an Integrated Circuit Array

S210, which includes evaluating a predicate state of a computing tile, may function to evaluate a predicate state of a subject computing tile based at least on an evaluation of a plurality of distinct computing/processing elements (e.g., an integrated circuit array, array processing cores, processing cores, etc.) defining the computing tile. Accordingly, an evaluation of the explicit predicate states of each processing core or processing element within a computing tile may function to inform an implicit predicate state of the computing tile. In one or more embodiments, an explicit predicate state of each processing core may be determined based on an evaluation of a predicate condition of or an identification of a predicate state value for each respective processing core. In one or more embodiments, an implicit predicate state of a computing tile may relate to an indication as to whether an instruction for branching around a subject set of instructions that affects an entirety of the plurality of distinct processing elements of the computing tile should be made.

In a preferred embodiment, a sum or an aggregate of the explicit predicate state values of the processing cores within a given computing tile or a computed implicit predicate state of the given computing tile may function to control a branch around operation for a target set of instructions intended for the processing cores within the given computing tile.

In a preferred embodiment, an integrated circuit (e.g., system 100) as referred to herein may include a plurality of distinct computing tiles. In such preferred embodiment, each of the plurality of distinct computing tiles of the integrated circuit may include or be defined by a plurality of distinct processing elements, such as a group of array processing cores (e.g., array cores 110). While, in some embodiments, each of the plurality of computing tiles of an integrated circuit may function to communicate or otherwise interface with each other when performing one or more operations, an instructions processing and/or a data propagation operation of a given computing tile of the plurality of computing tiles may be independent of other computing tiles. Consequently, a grouping of processing elements or a grouping of array processing cores defining each computing tile may also operate independently from other groupings of processing elements or array processing cores of other computing tiles that may be arranged on an integrated circuit.

It shall be recognized that, while a demarcation of a grouping of processing elements defining a computing tile may be physically made on an integrated circuit (e.g., physically disparate computing tiles), the demarcation of groupings of processing elements for defining a computing tile and/or in some embodiments, for defining sub-groupings of processing elements within a computing tile may be virtual, as described in U.S. Pat. No. 10,691,464, which is incorporated herein in its entirety by this reference.

Additionally, or alternatively, each of the processing elements or processing cores of a given computing tile may be associated with a distinct predicate stack, a predicate state value of which, may function or be used to control an executional state of the associated processing element, as described in U.S. Pat. No. 10,761,848, which is incorporated herein in its entirety by this reference.

Accordingly, in one or more embodiments, each predicate stack associated with a distinct processing core of a given computing tile may include a predicate condition that, when evaluated, may produce a predicate (state or condition) value comprising a binary result or the like, such as one value of the following example binary pairings including, but not limited to, True/False, True/Not True, 1/0, Active/Inactive, and/or the like.

2.12 Predicate Value Evaluation::Non-Loop Predicates||IF/THEN, IF/ELSE

S210 includes S212, which includes evaluating non-loop predicate states of an array of processing cores of a computing tile, may function to assess a predicate condition that affects a predicate state value of a predicate stack associated with each of the processing cores of the computing tile.

If/then Predicate Condition

In one or more embodiments, if an evaluated predicate condition for executing a pending instruction at a given processing core includes a simple If/Then statement or condition, a computed predicate (state) value for a predicate stack of the given processing core may be either True or False (i.e., 1 or 0) whereby if the predicate condition evaluates to True then the given processing core may function to execute a set of pending instructions associated with the predicate condition; conversely, if the predicate condition evaluates to False, then the given processing core may function not to execute the set of pending instructions. In such embodiments, S210 may function to evaluate the predicate condition for the given processing core to a binary positive value or a binary negative value, such as True and/or 1 or False and/or 0, indicating that the given processing core intends or does not intend to execute the instructions associated with the If/Then condition.

If/Else Predicate Condition

In one or more embodiments, in which an evaluated predicate condition includes an If/Else condition or statement, a computed predicate value for a predicate stack of a given processing core may be either True or False for the If statement of the If/Else condition whereby when the If statement evaluates to True, then instructions associated with the If statement may be executed while instructions of the Else statement may not be executed. In such embodiment, S210 may function to evaluate the predicate condition for the given processing core to a binary positive value, such as True and/or 1, indicating that the given processing core intends to execute the instructions associated with the If statement. Conversely, if the If statement evaluates to False, then only the instructions of the Else statement may be executed by the subject core. Predicate value is a computed value determined based on an evaluation of a given predicate condition of a given array processing core, which determines whether or not the given array processing core will execute or be active on a set of instructions.

2.14 Predicate Value Evaluation::Loop Predicates∥Nested Loops

S210 includes S214, which includes evaluating loop predicate states of an array of processing cores of a computing tile, may function to assess a predicate condition that affects a predicate state value of a predicate stack associated with each of the processing cores of the computing tile processing loops.

At an evaluation of each predicated processing core of a given computing tile that may be processing loop instructions, S210 may preferably function to execute, at a beginning of a set of loop instructions, a loop depth instructions that causes a tally or causes an instructions generating circuit to take a count of the number of processing cores that may be active for potentially processing the set loop instructions. That is, in some embodiments, only a subset of processing cores of the plurality of distinct processing cores of a given computing tile may be active for processing a set of loop instructions (a loop body). In such embodiments, predicate states of only the subset of processing cores (active cores) may be evaluated separately or independently of other processing cores within the computing tile, which may be inactive for purposes of executing the set of loop instructions. In this way, predicate state value data for the subset of processing cores may additionally include a reference to a loop depth thereby enabling an instructions generating circuit to accurately track the set of loop instructions affecting the predicate state of the subset of processing cores.

Additionally, or alternatively, S210 if executing the loop depth instruction prior to entry of a loop body may function to cause an instructions generating circuit or the like to increment a loop depth counter that, once incremented, identifies a depth or position of the set of loop instructions within a nested loop or with respect to other distinct sets of loop instructions (i.e., other distinct loop bodies) in the case of nested loops.

Accordingly, in addition to evaluating the predicate condition (e.g., If/Then, If/Else, etc.) of a loop instruction, S210 may function to identify a number of processing cores evaluating to True or a similar positive processing value and a loop depth at which the number of processing cores remain active.

Additionally, or alternatively, in an evaluation of the predicate state of a subset of processing cores that may be active for processing a set of loop instructions, S210 may function to execute a core enablement instructions that may include a loop depth decrementing instructions that causes an instructions generating circuit or the like to decrement the loop counter such that a return to the loop depth instruction ahead of the entry of the set of loop instructions reflects a proper loop depth value.

2.16 Enablement Evaluation∥Core Enablement

Additionally, or alternatively, S210 includes S216, which may function to, independently and/or in parallel, evaluate an enablement state or condition of each of a plurality of processing cores within a given computing tile. In a preferred embodiment, each of the plurality of processing cores defining an array of processing cores of the given computing tile may additionally include an enablement property that governs whether each processing cores may be available (i.e., ON/OFF, Active/Inactive, etc.) for processing instructions. It shall be noted that the enablement property of a given core, in a preferred embodiment, is distinct from the top of stack value of an associated predicate stack of a given core. Thus, while a top of stack value of a predicate stack may be True or indicate a willingness of a given processing core to execute a set of instructions, if the enablement property or enablement bit of the given processing core is set to OFF, a value of 0, or the like, then it is likely that the given processing core may not be in an Active state to processing any set of instructions.

Accordingly, in evaluation of either non-loop predicates or loop predicates, S210 preferably may function to evaluate the predicate state of the computing tile on a per-core basis in which the predicate state of each processing core of the plurality of processing cores defining the computing tile is evaluated and a predicate value identified.

In a variant implementation, if an integrated circuit array of a single, given computing tile may be virtually partitioned into multiple distinct groups of processing elements or processing cores, S210 may function to separately or distinctly evaluate the predicate state of each grouping or sub-grouping of processing cores of the computing tile thereby effectively treating each of the sub-groupings of processing cores of the computing tile as belonging to or defining distinct sub-computing tiles within the computing tile.

2.20 Predicate Values Propagation and Distributed Summation

S220, which includes informing an instructions generation circuit of the predicate state of a given computing tile, may function to propagate, in a distributed manner, predicate (value) state data of a plurality of processing cores defining a computing tile in a form of a summed predicate value or in a form of a plurality of distinct predicate values of each of the plurality of processing cores of the computing tile. In such embodiments, each predicate value obtained from each processing core of the computing tile may include a two-part predicate value that includes a top stack value of a predicate stack and an enablement bit value of each associated processing core. Thus, a predicate value as referred to herein may relate to or include a top of stack value of a predicate stack along with an enablement bit value for a given processing core.

2.21 Pre-Arrival to IMD (Instruction Memory Dispatcher) Summation∥Tile Predicate State Computation In a preferred implementation, S220 may function to implement a pre-arrival summation computation of a plurality of predicate values of the processing cores of a given computing tile. In such preferred embodiment, S220 may function to sum a plurality of top of stack values for the entirety of the processing cores and sum a plurality of enablement values for the entirety of the processing cores prior to and/or on the way to the instructions generating circuit. That is, such embodiments, a summation of the plurality of predicate values of a given computing core may be performed in advance of the instructions generating circuit and only a single summed predicate value (i.e., a single summed top of stack value and a single summed enablement bit value) may be propagated to the instructions generating circuit.

2.21.1 Distributed Summation::Logic Circuity-Based Summation

Figure 4:
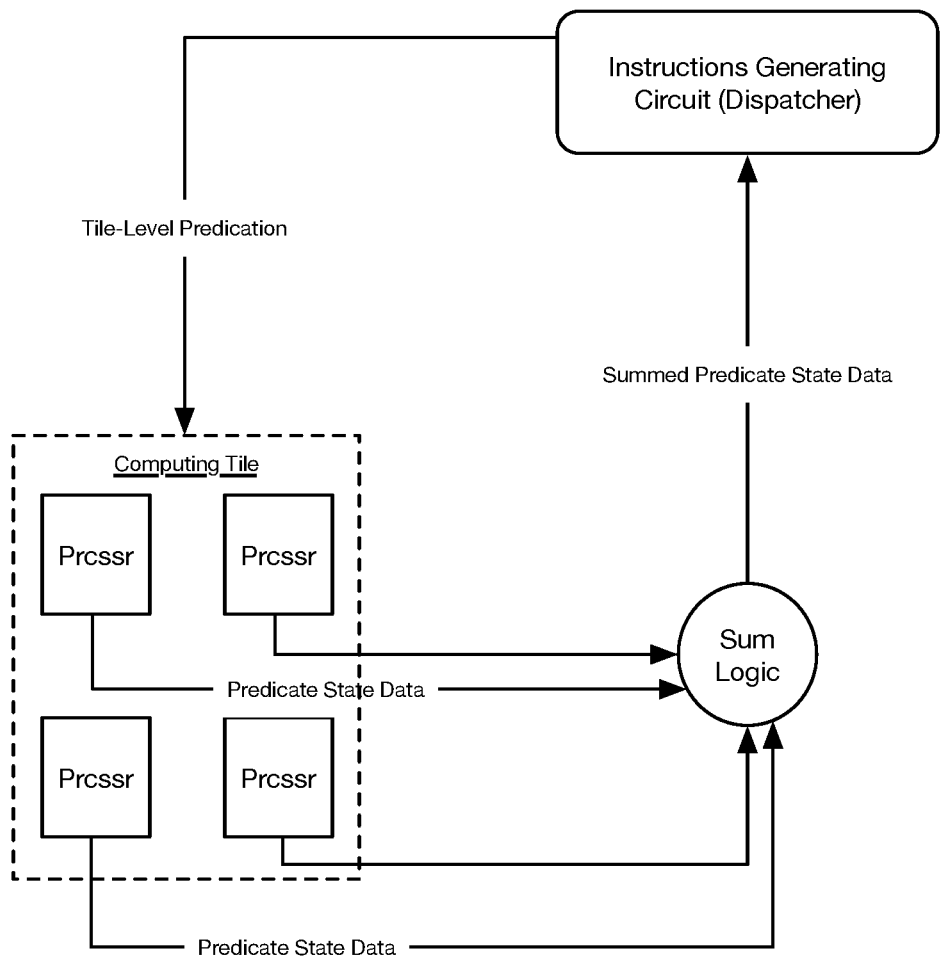
FIG. 4 illustrates a schematic that examples a logic-based summation of predicate state values in accordance with one or more embodiments of the present application.

In a first implementation, S220 may include S222, which may function to implement logic circuitry (i.e., summation logic) that preferably functions to collect and sum the plurality of predicate state values of the plurality of processing cores of a given computing tile, as shown by way of example in FIG. 4. In this first implementation, each of the plurality of processing cores of the computing tile may be in electrical communication, via electrical traces or the like, with a summation logic. In one embodiment, the summation logic may be located on-tile, such that each of the plurality of processing cores may efficiently and/or quickly provide its predicate values to the summation logic. In another embodiment, the summation logic may be arranged or located off-tile at an intermediate position between the computing tile and a target instructions generating circuit. In such embodiment, a summation of the predicate values may be performed along the way to the instructions generating circuit.

Additionally, or alternatively, in this first implementation, S220 may function to implement the summation logic circuitry to aggregate or sum the top of stack values independently or separately from the enablement bit values of the plurality of processing cores of the computing tile.

In a variant of this first implementation, S220 may function to implement two distinct summation logic circuitry, such as a top of stack (ToS) summation logic and an enablement bit summation logic. In this variant of the first implementation, the top of stack values for the plurality of processing cores may travel along a distinct signal path to a first summation logic and the enablement bit values for the plurality of processing core may travel along a second distinct signal path to a second summation logic. In one or more embodiments, each of the first summation logic (i.e., ToS summation logic) and the second summation logic (i.e., enablement bit summation logic) may have distinct signal paths to the instruction generating circuit that allows each of which to separately pass a summed top of stack value and a summed enablement bit value along to the instructions generating circuit.

In a further variant of the first implementation, a plurality of distinct summation logic circuitry may be implemented for a plurality of distinct virtual sub-groups of processing cores of a given computing tile. That is, in one or more embodiments, a computing tile while implementing a single physical corpus of processing cores or circuits, the corpus of processing cores may be virtually partitioned into mini-groups or sub-groups of processing cores that may function to operate independently (e.g., process different sets of instructions and/or data) of each other. In such embodiments, each sub-group of processing cores may propagate predicate values to at least one distinct summation logic for computing summed predicate values.

2.21.2 Distributed Summation::Pipeline Stages-Based Summation

Figure 5:
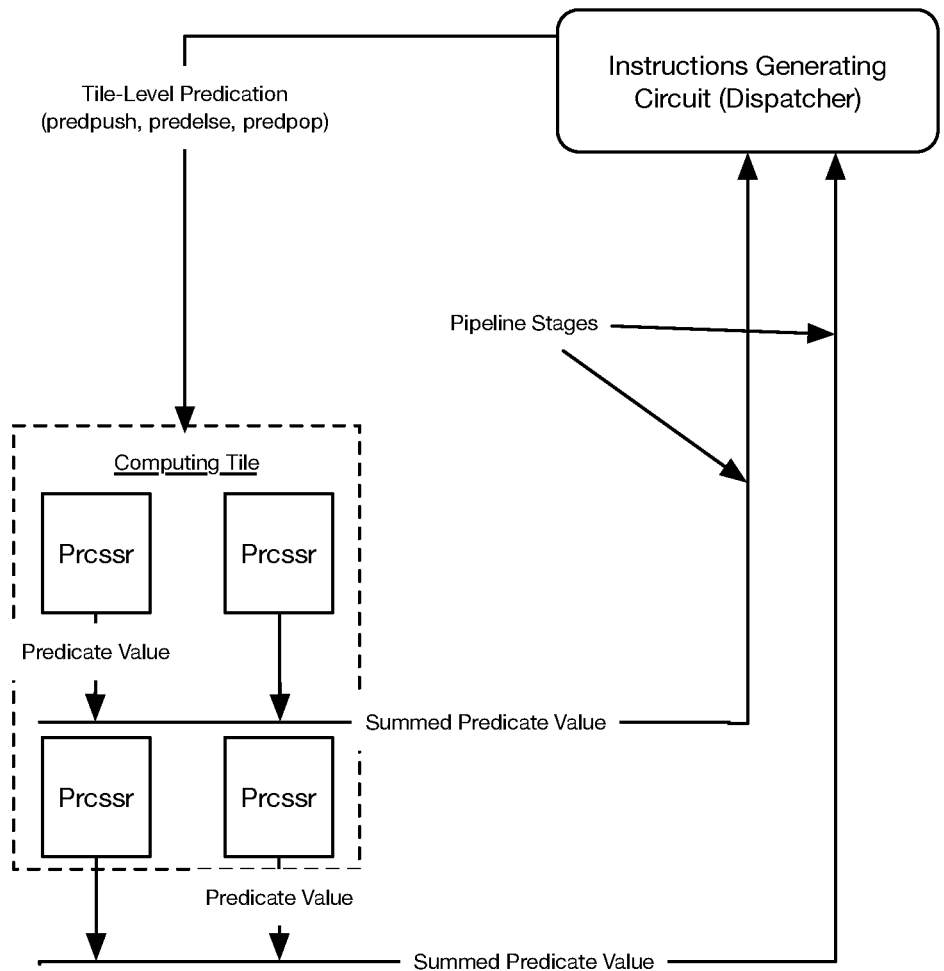
FIG. 5 illustrates a schematic that examples a pipeline stage summation of predicate state values in accordance with one or more embodiments of the present application.

In a second implementation, S220 may include S224, which may function to implement a plurality of distinct pipeline stages that collect and/or sum a plurality of predicate (state) values of the plurality of processing cores of a given computing tile, as shown by way of example in FIG. 5. In this second implementation, each of the plurality of cores of the given computing tile may be in electronical communication with a distinct signal collection stage of a distinct summation pipeline.

In one embodiment, the predicate values, including a top of stack value and/or an enablement bit value, of each of a plurality of processing cores of a subject computing may be propagated to a register or similar storage circuit along a pipeline stage. In such embodiments, a summation or other combination circuit may function to sum the predicate values input into each of the respective stages of the summation pipeline and output a single summed predicate value.

In one or more embodiments, a top of stack value for each of the plurality of processing cores of a computing tile may be provided alternately from the enablement bit value of the plurality of processing cores. In this way, a summation of the top of stack values of the plurality of processing cores may be performed at one-shot by the summation pipeline and in an alternate shot, the same summation pipeline may function to collect and sum the enablement bit values of the plurality of processing cores.

Additionally, or alternatively, in one or more embodiments, each processing core of a plurality of processing cores of a computing tile may be in electrical communication with at least two distinct pipeline stages. In such embodiment, each processing core may be connected to a first pipeline stage for collecting and summing a top of stack value and a second pipeline stage for collecting and summing an enablement bit value from each processing core.

In a second implementation, each distinct pipeline stage of a plurality of distinct pipeline stages may function to compute or output a single summed predicate value. In one embodiment, the single summed predicate value from each distinct pipeline stage may be propagated to yet pipeline stages that may function to collect the single summed predicate value from each of the plurality of distinct pipeline stages and aggregate the single summed predicate values into a final summed predicate value that may be propagated directly to an instructions generating circuit or the like. In one variant, each of the plurality of distinct pipeline stages may function to propagate the single summed predicate value directly to the instructions generating circuit or the like where at the instructions generating circuit may function to compute the final summed predicate value based on a summation of each of the single summed predicate values.

In a third implementation, S220 may function to implement a compositional summation architecture that includes a plurality of distinct pipeline stages that collect and sum predicate values from the plurality of processing cores of a given computing tile and that each output a single summed predicate value to one or more summation logic circuitry that produces or outputs a single, final summed predicate value based on the summation of each of the single summed predicate values of the distinct pipeline stages. In such embodiment, the summation logic may function to propagate the final, summed predicate value for the given computing tile to an instructions generating circuit or the like.

It shall be recognized that summation logic circuitry and summation pipeline stages may implemented either singly or in any suitable combination, without departing from the intentions and embodiments of the present application, to achieve a summation of predicate values of a plurality of processing cores of a given computing tile.

2.23 Post-Arrival to IMD (Instruction Memory Dispatcher) Summation||Tile-Level Predicate State Computation Additionally, or alternatively, in some embodiments, S220 may function to collect and pass the predicate state value of each of the plurality of processing cores of a given computing tile directly to an instructions generation circuit. In such embodiments, S220 may function to propagate the predicate state values for a given computing tile in an unsummed state or a partially summed state depending on an availability or use of intermediate summation components or circuitry between the array of processing cores of the computing tile and the target destination (e.g., the instructions generating circuit) of the predicate state values.

In the circumstance that the predicate state values of the processing cores of the computing tile are propagated to the instructions generating circuit in an unsummed state, the instructions generating circuit may function to compute a coarse predicate state for the computing tile based on a summation of predicate state values from the entirety of the array of processing cores of the computing tile. Similarly, to the above implementations and/or embodiments, S220 may function to implement a two-part summation in which the top of stack predicate values for all processing cores of the computing tile are summed together in first summation operation and, independently, in a second summation operation, sum the enablement values for all processing cores of the computing tile.

2.30 Tile-Level Predication & Branch Execution

S230, which includes identifying whether to execute a tile-level predication, may function to compute whether to execute one or more tile-level predications affecting an entirety of a plurality of distinct processing cores of a given computing tile based on a calculated sum of a plurality of distinct predicate state values of the plurality of distinct processing cores. A tile-level predication as referred to herein preferably relates to an execution of a branch to a target that is performed at each of a plurality of distinct processing cores of a computing tile thereby avoiding a handling of a subject set of instructions pending with each of the plurality of distinct processing circuits of the computing tile.

In one or more embodiments, a summed predicate state value for the plurality of distinct processing cores of a given computing tile together with an identification of the predicate condition(s) at each of the plurality of distinct processing cores may be used as input for computing the one or more tile-level predications for a plurality of distinct processing cores of the computing tile.

Additionally, or alternatively, in some variant embodiments, S230 may function to implement a tile predicate stack or a global predicate stack that controls whether all or a grouping of processing elements of the given computing tile may branch around a target set of instructions based on the propagated summed array predicate value.

2.32 Non-Loop Predicate Branching

S230 includes S232, which may function to compute a tile-level predication for a non-loop predicate condition, may function to identify whether or not to execute a global branch instruction across a plurality of distinct processing cores of within a computing tile based on a summed predicate state value computed based on the summation of the predicate state values for each of the plurality of distinct processing cores of the computing tile.

In one or more embodiments in which a predicate condition across a plurality distinct processing cores of a given computing tile includes an If/Then condition, S232 may function to identify whether the summed predicate state value for the predication condition across the plurality of distinct processing cores of the computing tile evaluates to a number that is zero or greater than zero (e.g., pred state sum=0 or pred state sum>0) and whether the predicate state value for the enablement bit evaluates to greater than zero. If the summed predicate state value is evaluated as a value (e.g., all False) equaling zero, S232 may function to implement a global execution of a branch to a target that avoids a subject set of instructions associated with the predicate condition. In such embodiments, S232 may function to implement an internal branching instruction within an instructions generating circuit that may function to alter or change an instruction stream to the computing tile and/or to each of the plurality of distinct processing circuits of the computing tile. In this way, the instructions generating circuit avoids streaming the instructions that were branched around and each of the plurality of distinct processing cores may only witness an instruction stream that does not include the subject set of instructions associated with the predicate condition. Alternatively, if the summed predicate state value is evaluated as a value (e.g., one or more Trues) that is greater than zero, S232 may function to maintain a current instructions executional state at each of the plurality of distinct processing cores.

In one or more embodiments in which a predicate condition across a plurality distinct processing cores of a given computing tile includes an If/Else condition, S232 may function to identify whether the summed predicate state value for the If statement of the predication condition evaluates to a number that is zero or greater than zero and whether the predicate state value for the enablement bit evaluates to greater than zero. If the summed predicate state value is evaluated as a value (e.g., all False) equaling zero, S232 may function to implement a global execution of a branch to a target that is the Else instructions at each of the plurality of distinct processing circuits of the computing tile that avoids a subject set of instructions associated with the If statement of the predicate condition. In such embodiments, S232 may function to implement an internal branching instruction (e.g., a predelse or the like) within an instructions generating circuit to or the like to a branch to a target pointing to a start of the Else instructions associated with the Else statement of the predicate condition. Alternatively, if the summed predicate state value is evaluated as a value (e.g., one or more Trues) that is greater than zero and the summed predicate value for the If statement equals the sum of the enablement bit values of the plurality of distinct processing cores, S232 may function to implement a global execution of a branch to a target that avoids the Else instructions associated with the Else statement of the predicate condition. That is, in such embodiment, all of the active processing cores within the computing tile evaluated the If statement of the predicate condition to "True" thereby allowing an execution of the If instructions associated with the If statement and warranting an avoidance of the Else instructions associated with the Else statement of the predicate condition.

2.34 Loop Predicate Branching

S230 includes S234, which may function to compute a tile-level predication for a loop predicate condition, may function to identify whether or not to execute a global branch instruction across a plurality of distinct processing cores of within a computing tile based on a summed predicate state value computed based on the summation of the predicate state values for each of the plurality of distinct processing cores of the computing tile that may be active for processing one or more loops.

Similar to the tile-predication determination for non-loop predicate conditions (see S232), S234 may function to compute a tile-level predication for typical predicate conditions that include one of an If/Then condition and an If/Else condition. In addition to a determination of whether to execute a tile-level predication for a predicate condition associated with each of a plurality of distinct processing cores of a computing tile, S234 may function to identify a loop depth of a set of loop instructions with a predicate condition that may be under evaluation. Accordingly, in circumstances in which the plurality of distinct processing cores may be tasked with handling instructions having one or more nested loops, S234 may function to direct to a relevant loop depth a tile-level predication instruction and/or execution of a branch to a target. That is, S234 may function to direct tile-level predications to specific loop depths of a loop instruction having one or more nested loops therein.

Additionally, or alternatively, S234 may function to identify or tally a subset of processing cores of the plurality of distinct processing cores that may be active (i.e., enabled, enable bit value=1) for handling given loop instructions. In this way, the predicate condition for the subset of processing cores may be tracked and directed instructions including one or more of enablement/disablement instructions and tile-predicate instructions may be specifically directed to the loop depth of the loop instructions as well as to the specific subset of processing cores.

Accordingly, depending on a type of predicate condition (e.g., If/Then, If/Else, etc.) and a summed predicate state value for a plurality of distinct processing cores active for handling a given loop instruction, S234 may function to execute a global or tile-level predicate instruction, such as a predpush to a branch target that branches around the loop instructions or such as a predelse to a branch target that branches around an If statement instruction for executing the loop instruction to an Else statement instruction for executing the loop instructions.

2.36 Intra-Loop Predicate Branching

Additionally, or alternatively, S230 includes S236, which may function to compute a tile-level predication for an intra-loop predicate condition. In one or more embodiments, loop instructions may include one or more predicate conditions within a loop body of the loop instructions. In such embodiments, S236 may function to identify whether to compute a tile-level predication based on one or more of a type of loop discontinuance predicate condition and a summed predicate state value associated with the plurality of distinct processing cores that may be active for handling the subject loop instructions.

Similar to S234, S236 may function execute pre-loop instructions that causes an instructions generating circuit or the like to tally a number of processing cores that may be active for handling a set of given loop instructions and additionally may function to identify a loop depth of the set of given loop instructions.

Additionally, or alternatively, S236 may function to identify a predicate condition type for a predicate condition that may be found within a loop body that includes a set of loop instructions. That is, in some embodiments, a predicate condition (i.e., intra-loop predicate condition) may exist within a loop body that may function to control one or more aspects of executing the loop body by a given processing core. For instance, in one embodiment, a predicate condition type within a loop body may include a predicate condition for a loop continue that, if evaluated to True, results in a premature exit or stoppage of an execution of a current iteration (i.e., a mid-stream of execution exit) of the associated loop instructions by a given processing core. In another example, a predicate condition type within a loop body may include a predicate condition for a loop break that, if evaluated to True, results in a premature exit by a given processing core from executing future iterations of the associated loop instructions.

Accordingly, depending on a type of intra-loop predicate condition (e.g., loop continue predicate condition or Disable C, loop break predicate condition or Disable B, etc.) and a summed predicate state value for a plurality of distinct processing cores active for handling a given loop instruction, S236 may function to execute a global or tile-level predicate instruction, such as a disablement break instruction or a disablement continue instruction that causes one of a discontinuance of a processing operation by the plurality of distinct processing cores handling the loop instruction from executing future iterations of the loop thereby branching around the loop instructions and a discontinuance of a processing operation by the plurality of distinct processing cores from executing a current iteration or active iteration of the loop and a branch back to a entry of the loop. Preferably, the tile-level predication instruction, whether a disablement break or a disablement continue instruction, may be directed to the identified loop depth of the associated loop body or loop instructions.

It shall be noted that while the process flow and/or one or more embodiments herein describe methods and/or techniques for intelligently implementing tile-level predications for computing tiles, in one or more embodiments, the optimization of the inner loop instructions and the execution of the multi-part implicit branch instruction, as described in U.S. patent application Ser. No. 17/127,213, which is incorporated herein in its entirety by this reference, may be implemented together with the techniques and methods for tile-level predications. In particular, since it may be contemplated herein that the loop optimizations may be performed at compile time and the execution of the multi-part implicit branch instruction and tile-level predications may be executed at runtime, a distinct method for implementing a combination of the techniques is contemplated by the various embodiments described herein.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A method of implementing tile-level predication of a computing tile of an integrated circuit, the method comprising:

identifying a plurality of distinct predicate state values for each of a plurality of distinct processing cores of the computing tile of the integrated circuit;

calculating one or more summed predicate state values for an entirety of the plurality of distinct processing cores based on performing a summation operation of the plurality of distinct predicate state values;

propagating the one or more summed predicate state values to an instructions generating circuit of the integrated circuit; and identifying, by the instructions generating circuit, a tile-level predication for the computing tile based on input of the one or more summed predicate state values.

2. The method according to claim 1, wherein identifying the distinct predicate state values includes:

identifying a top of stack value of a distinct predicate stack associated with each of the plurality of distinct processing cores of the computing tile based on an evaluation of an associated predicate condition; and identifying a bit value of a distinct enablement bit associated with each of the plurality of distinct processing cores of the computing tile.

3. The method according to claim 1, wherein calculating the one or more summed predicate state values includes:

collecting, at one or more summation logic circuitry of the integrated circuit, the plurality of distinct predicate state values from the plurality of distinct processing cores; and in response to the collecting, performing the summation operation of the plurality of distinct predicate state values.

4. The method according to claim 3, wherein the performing the summation operation includes:

performing a first summation operation that includes summing only a plurality of top of distinct stack values of a plurality of distinct predicate stacks of the plurality of distinct processing cores; and performing a second summation operation that includes summing only a plurality of distinct enablement bit values of the plurality of distinct processing cores.

5. The method according to claim 1, wherein calculating the one or more summed predicate state values includes:

collecting, via a plurality of distinct pipeline stages, the plurality of distinct predicate state values from the plurality of distinct processing cores; and performing the summation operation of the plurality of distinct predicate state values along the plurality of distinct pipeline stages.

6. The method according to claim 5, wherein the performing the summation operation includes:

performing a first summation operation that includes summing only a plurality of top of distinct stack values of a plurality of distinct predicate stacks of the plurality of distinct processing cores; and performing a second summation operation that includes summing only a plurality of distinct enablement bit values of the plurality of distinct processing cores.

7. The method according to claim 1, wherein:

calculating the one or more summed predicate values includes implementing a plurality of distinct pipeline stages that calculate the one or more summed predicate values, and the propagating the one or more summed predicate state values includes propagating the one or more summed predicate values from the plurality of distinct pipeline stages to the instructions generating circuit.

8. The method according to claim 1, wherein:

calculating the one or more summed predicate values includes implementing one or more summation logic circuitry that calculate the one or more summed predicate values, and the propagating the one or more summed predicate state values includes propagating the one or more summed predicate values from the one or more summation logic circuitry to the instructions generating circuit.

9. The method according to claim 1, wherein the identifying the plurality of distinct predicate state values includes:

identifying a loop depth of a nested loop body;

incrementing a loop depth counter based on the identified loop depth;

tallying a subset of processing cores of the plurality of distinct processing cores that are in an active state for executing the nested loop body; and identifying predicate state values of the subset of processing cores separately from the plurality of distinct predicate state values as a remainder of the plurality of distinct processing cores that are in an inactive state for executing the nest loop body.

10. The method according to claim 9, wherein the identifying the tile-level predication for the computing tile includes:

identifying, by the instructions generating circuit, a target branch instruction directed to the identified loop depth of the nested loop body that, when executed, branches around the nested loop body based on a sum of the predicate state values of the subset of processing cores.

11. The method according to claim 1, wherein the identifying the plurality of distinct predicate state values includes:

identifying one or more predicate conditions within a loop body;

identifying a predicate condition type including one or more of (i) a break disablement condition for discontinuance of an ongoing execution of future iterations of the loop body and (ii) a continue disablement condition for discontinuance of an ongoing execution of a currently executing iteration of the loop body; and identifying predicate state values for each of the one or more predicate conditions with the predicate condition type.

12. The method according to claim 11, the identifying the tile-level predication for the computing tile includes:

identifying, by the instructions generating circuit, a target branch instruction directed to an identified loop depth of the loop body that, when executed:

(a) branches around a remainder of instructions within the loop body based on a sum of the predicate state values of a subset of processing cores and identifies the predicate condition type as the continue disablement condition, or (b) branches around an entirety of instructions of the loop body to thereby avoid executing additional iterations of the loop body.

13. The method according to claim 1, further comprising:

executing a branch target instruction to branch around a target instruction that avoids a target set of instructions accessible to the plurality of distinct processing cores based on identifying the tile-level predication.

14. The method according to claim 1, wherein identifying a branch instruction to a target instruction based on an evaluated predicate condition of the plurality of distinct processing cores of the computing tile; and executing the branch instruction to the target instruction if all the plurality of distinct processing cores are identified as inactive for the target set of instructions based on the one or more summed predicate state values.

15. The method according to claim 1, wherein the plurality of distinct predicate state values includes:

(i) a plurality of distinct top of stack values for a plurality of distinct predicate stacks of the plurality of distinct processing cores of the computing tile; and (ii) a plurality of distinct enablement bit values of the plurality of distinct processing cores of the computing tile.

16. The method according to claim 1, wherein:

the instructions generating circuit is arranged off of the computing tile, and the propagating the one or more summed predicate state values includes passing the one or more summed predicate state values from positions on the computing tile to the instructions generating circuit arranged off of the computing tile.

17. The method according to claim 1, wherein identifying the tile-level predication of the computing tile includes:

at the instructions generating circuit, toggling the tile-level predication between an active state and an inactive state for a target set of instructions based on the input of the one or more summed predicate state values.

\* \* \* \* \*